Jan. 30, 1968

J. G. RUPERT 3,366,370

CONTROL APPARATUS

Filed Dec. 6, 1965

INVENTOR.
JOHN G. RUPERT
BY
ATTORNEY

United States Patent Office 3,366,370
Patented Jan. 30, 1968

3,366,370
CONTROL APPARATUS
John G. Rupert, St. Anthony Village, Minn., assignor to Honeywell, Inc., Minneapolis, Minn., a corporation of Delaware
Filed Dec. 6, 1965, Ser. No. 511,853
6 Claims. (Cl. 261—29)

ABSTRACT OF THE DISCLOSURE

Interfacing apparatus comprising a cylindrical chamber having peripheral inlet means for admitting a liquid into the chamber in such a manner as to provide vortical liquid flow in the chamber, axial inlet means for admitting a gas into the chamber to comprise a gaseous core for the liquid vortex, and axial outlet means providing egress from the chamber for fluid, which includes both the liquid and the gas; the outlet means further including separating means dividing the effluent fluid into two parts, one of which is entirely liquid or, one of which is entirely gas.

Figure 1:
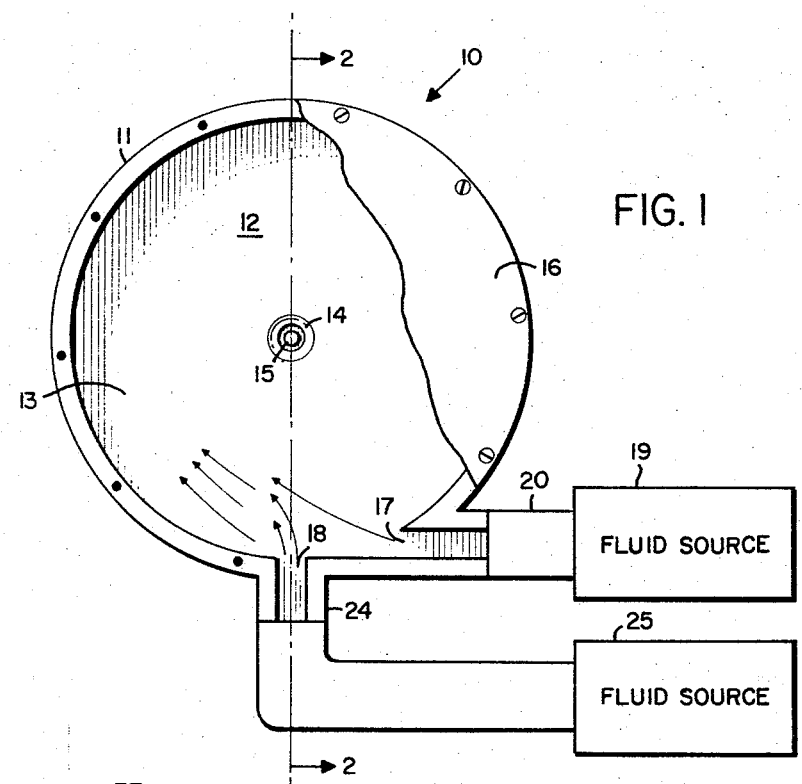

This invention pertains generally to fluid control devices and more specifically, to a fluid control device for interfacing two fluid signals.

Since approximately 1960 there has been a rapid development of fluid devices, such as fluid amplifiers, fluid vortex rate sensors, and fluid logic elements. The primary emphasis in this new field of technology is to perform functions such as sensing, controlling, monitoring and metering, with the use of fluid devices having no moving parts other than the fluid. Such fluid control devices are referred to in the art as pure fluid devices. These devices use liquids, gases, and mixtures of liquids and gases as power fluid.

In most applications it is desirable to use only a liquid or only a gas in a fluid amplifier, since mixtures of liquids and gases sometimes cause unexpected behavior of the fluid devices. Nevertheless, in some applications it is desirable to take advantage of the properties of both the liquids and gases. To do this the normal procedure is to have the fluid devices segregated, one portion of the system including fluid devices using only liquid and a separate portion of the system including fluid devices using only gas, and then providing an interface between the two portions of the system. This is desirable since fluid amplifiers using air have certain advantages, such as the relative ease of cascading fluid amplifiers, since excess air can be vented to the atmosphere. In addition, for air, a closed system is not required, nor need there be concern for small leaks at joints in the system. With liquid this is not true particularly if the liquid desired to be used is the engine fuel itself.

Obviously then, one must have an effective means for converting a liquid signal to a pneumatic signal or conversely a pneumatic signal to a liquid signal. As mentioned previously, mixing fluid directly within the fluid devices normally leads to unpredictable behavior of the fluid devices as well as the device to be controlled. For example, air bubbles in a liquid fuel line to an engine would cause engine performance problems. Thus, there is a need for a reliable and consistent device to interface a liquid and a gas. It is precisely this problem of transferring signals between two fluids that has been solved by applicant's two fluid vortex interfacing device.

Briefly, applicant's invention comprises a cylindrical chamber having peripheral inlet means for admitting a liquid into the chamber in such a manner as to provide vortical flow of liquid in the chamber, axial inlet means for admitting a gas into the chamber to comprise a gaseous core for the liquid vortex, and axial outlet means providing egress from the chamber for fluid which includes both the liquid and the gas, the outlet means further including separating means dividing the effluent fluid into two portions, one of which is entirely liquid or, one of which is entirely gas.

Figure 2:
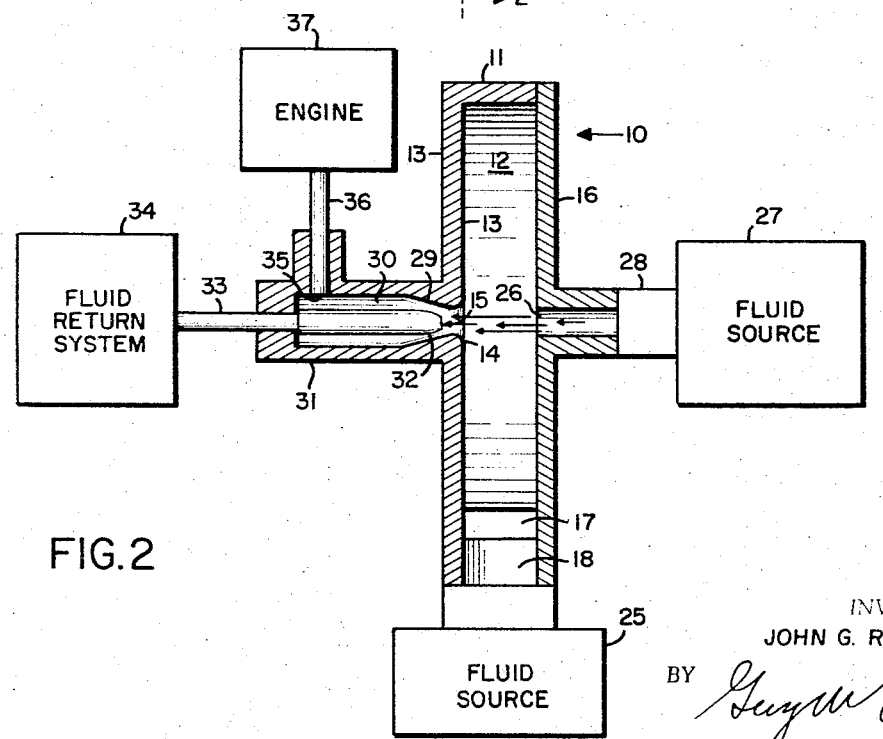

The functioning of applicant's device will become apparent from a consideration of the attached drawing, in which:

FIGURE 1 is a front view of applicant's invention, with the front plate partially broken away; and FIGURE 2 is a cross sectional view of the apparatus taken generally along line 2—2 of FIGURE 1.

Referring to the drawing, reference numeral 10 generally identifies applicant's liquid-gas interfacing device. A cylindrical member 11 forms the outer boundary of a chamber 12. Attached to cylindrical member 11 is a back plate member 13 having a fluid outlet 14 therein. Cooperating with outlet 14 is a second fluid outlet 15, said first and said second outlets being coaxially aligned.

It has been discovered that outlet 15 performs best if the end of outlet 15 is located at a distance less than the diameter of outlet 15 from plate 16, however it is not necessary that it be located there for proper operation. Chamber 12 is closed by a front plate 16.

A first control port 17 is shown for injecting fluid into the chamber 12 tangentially. A second control port 18 is shown for injecting fluid radially into chamber 12. A fluid source 19, is connected to control port 17 by means of conduit 20. Similarly, a second output from a second fluid source 25 is supplied to control port 18 by means of fluid conduit 24.

Referring to FIGURE 2, front plate 16 is shown to have a central inlet port 26. A third fluid source 27 is connected to chamber 12 through conduit 28. Fluid supplies 19, 25, and 27 function as valves and may be an output from a proportional or bistable fluid amplifier or a mechanical or electrical type valve.

Outlet 14 provides a deenergizing transition 29 between chamber 12 and a second chamber 30 formed by a capped cylindrical housing 31. Fluid outlet 15 extends axially in chamber 30 and has an externally tapered portion 32 adjacent to outlet 14. Fluid outlet 15 is connected by conduit 33 with a fluid return system 34. A second outlet 35 in chamber 30 is connected by a conduit 36 to a liquid utilization device 37 which may, for example, comprise an aircraft engine.

In normal operation of applicant's liquid-gas interfacing device liquid is supplied from fluid sources 19 and 25 through control ports 17 and 18 and exhausts through outlet 14. This results in a spiraling motion of the fluid within chamber 12, as indicated by the arrows in FIGURE 1. This type of fluid is commonly called vortex flow. The amount of fluid that flows through chamber 12 can be controlled by various means, and varying of the spiral fluid motions in the chamber is possible by merely changing the rate of the fluid flowing from sources 19 and 25.

Referring to FIGURE 2, the operation with the control of the liquid gas interface is more completely shown. Once the liquid vortical flow has been established in chamber 12 as described previously, the fluid exhausts through outlet 14 and outlet 15. With only a liquid emitted from fluid sources 19 and 25 the resulting fluid flow through outlet 14 is entirely liquid flow, and consequently only liquid will flow into fluid return tank 34 and into engine 37. This is the condition of maximum fuel flow to engine 37.

If the amount of fluid or fuel available to the engine is to be changed, a gaseous signal from fluid source 27 is injected into vortex chamber 12. For this signal, any gas which has a lesser density than the liquid in the outer portion of chamber 12 may be used; however, for illustrative purposes air will be described. The air entering chamber 12 flows in a pattern indicated by the arrows in FIGURE 2. Thus, there is established in the central region of the vortical flow within chamber 12 an air core. Since the liquid in chamber 12 has a substantial rotational velocity and thereby has centrifugal force pushing it outward, the air introduced in the central portion of chamber 12 having little or no rotational velocity remains in a stable position.

Operation of engine 37 is unsatisfactory if the fuel supply includes entrapped air. To exhaust the air from the center of the core region a second fluid outlet 15 is provided, which captures the air and prevents it from reaching conduit 36. Note that second fluid outlet 15 is located substantially coaxial with the axis of chamber 12 so that entrapped air can readily escape. If air is present within chamber 12 it can be appreciated that the opening 14 has an effectively smaller area for liquid to flow through, since now both the liquid and the air must flow through opening 14. Since the centrifugal force of the liquid will tend to divert the liquid radially outward, and since the rotation velocity of the air is very low and consequently the forces acting thereon, the air tends to flow into receiver 15 whereas the heavier liquid will maintain an annular flow pattern around second fluid outlet 15 and flow into passage 35. Thus the centrifugal force of the liquid causes it to flow outward while the air flows into fluid return tank 34 along with some liquid. This mixture of liquid and air in return tank 34 can be separated for reuse if desired. However, the amount of liquid fuel flowing to engine 37 is now limited because less liquid can flow through opening 14. Thus, the applicant has provided an apparatus for interfacing a liquid fuel with an air signal and thus altering the amount of liquid fuel available to an engine.

Converse interfacing can be effected by controlling the amount of air deliverable to a device with a liquid signal. That is, the outlet 15 may be made smaller to receive air only while outlet 35 receives a mixture of air and liquid. The control in this instance is achieved by varying the fluid vortex within chamber 12 by differentially varying the fluid sources 19 and 25.

While I have shown and described a particular embodiment in my invention, variations of my invention will now be obvious to those skilled in the art; therefore I wish it to be understood that I intend only to be limited by the appended claims.

I claim:
1. An apparatus of the class described comprising:
   a cylindrical chamber;
   a first inlet for introducing a first fluid tangential to said chamber;
   a second inlet for axially introducing a second fluid of a lesser density than said first fluid into said chamber;
   a first outlet located axially in said chamber and oppositely from said second inlet, means forming a second outlet concentrically aligned with said first outlet and downstream thereof so that when a swirling motion is imparted to said first fluid the amount of fluid exhausting through said first outlet is controlled by varying the amount of second fluid introduced and thus the amount of said first and second fluid exhausting through said second outlet.

2. The apparatus of claim 1 including a third inlet to the chamber for introducing the first fluid radially to said chamber, whereby the combination of said first and said third inlet imparts a swirling motion to said first fluid.

3. In a liquid-gas interfacing system:
   a cylindrical chamber, having a central axis, means forming a first control port for injecting a first fluid into said chamber in a rotational manner, a second control port for injecting said first fluid into said chamber in a radial manner;
   a first fluid supply means connecting said first fluid supply to said first control port and said second control port for supplying said first fluid to said chamber;
   a fluid inlet aligned axially with said chamber;
   a second fluid source;
   means connecting said second fluid supply to said fluid inlet for supplying a second fluid to said chamber;
   a first fluid outlet in said chamber, oppositely disposed to and co-axial with said fluid inlet;
   a housing connected to said fluid outlet; and
   means forming a second fluid outlet in said housing, said second fluid outlet being located coaxially with said chamber for receiving said first and said second fluid.

4. The system of claim 3 including a fluid return system and means connecting said second fluid outlet means to said return system.

5. The system of claim 4 including an engine and passage means connecting said engine to said housing.

6. The system of claim 3 wherein the second fluid outlet is located less than a distance equal to the diameter of said outlet from said chamber.

References Cited
UNITED STATES PATENTS

| | | | |
|---|---|---|---|
| 3,200,457 | 8/1965 | Wagstaff | 137—81.5 X |
| 3,267,946 | 8/1966 | Adams et al. | 137—81.5 |
| 3,272,213 | 9/1966 | Jones | 137—81.5 |
| 3,302,935 | 2/1967 | York | 261—29 |

FOREIGN PATENTS 694,387  7/1953  Great Britain.

HARRY B. THORNTON, *Primary Examiner.*

TIM R. MILES, *Examiner.*